United States Patent
Nagahisa et al.

(10) Patent No.: US 8,969,810 B2
(45) Date of Patent: Mar. 3, 2015

(54) INFRARED SENSOR DEVICE

(71) Applicants: Takeshi Nagahisa, Toyonaka (JP);
Katsuhiko Aisu, Takarazuka (JP);
Hirofumi Watanabe, Miki (JP)

(72) Inventors: Takeshi Nagahisa, Toyonaka (JP);
Katsuhiko Aisu, Takarazuka (JP);
Hirofumi Watanabe, Miki (JP)

(73) Assignee: Ricoh Company, Ltd., Tokyo (JP)

( * ) Notice: Subject to any disclaimer, the term of this patent is extended or adjusted under 35 U.S.C. 154(b) by 17 days.

(21) Appl. No.: 13/795,669

(22) Filed: Mar. 12, 2013

(65) Prior Publication Data
US 2013/0284931 A1    Oct. 31, 2013

(30) Foreign Application Priority Data
Mar. 13, 2012 (JP) ................. 2012-056147

(51) Int. Cl.
*G01J 5/02* (2006.01)
*G06M 7/00* (2006.01)
*G01J 1/46* (2006.01)
*G01J 5/10* (2006.01)
*G01J 1/42* (2006.01)
*G01J 5/00* (2006.01)

(52) U.S. Cl.
CPC .... *G01J 5/02* (2013.01); *G01J 1/46* (2013.01); *G01J 5/10* (2013.01); *G01J 1/4228* (2013.01); *G01J 5/0025* (2013.01)
USPC ......................................... 250/349; 250/221

(58) Field of Classification Search
CPC .............................. G01J 5/0022; G01J 5/0025
USPC .................................................. 250/221, 349
See application file for complete search history.

(56) References Cited

U.S. PATENT DOCUMENTS 5,313,060 A * 5/1994 Gast et al. .................... 250/221

FOREIGN PATENT DOCUMENTS

JP    2009-288498    12/2009

* cited by examiner

*Primary Examiner* — David J Makiya
*Assistant Examiner* — Kenneth J Malkowski
(74) *Attorney, Agent, or Firm* — Cooper & Dunham LLP

(57) ABSTRACT

An infrared sensor device includes a plurality of infrared sensors that is provided in a plurality of divided areas in which an infrared-receiving area is radially divided in one plane; a detector that detects presence or absence of movement of an object in the infrared-receiving area for each of the divided areas based on an output of the infrared sensor; and a determiner that determines whether the object is in a detection area in a predetermined distance range from the infrared sensor, based on an arrangement pattern of the divided areas in which the movement of the object is detected, in an alignment of the divided areas in the infrared-receiving areas.

9 Claims, 26 Drawing Sheets

WHEN HUMAN BODY CROSSES
INFRARED-RECEIVING AREA a# INFRARED SENSOR DEVICE

CROSS-REFERENCE TO RELATED APPLICATIONS

The present application is based on and claims priority from Japanese Patent Application Number 2012-056147, filed Mar. 13, 2012 the disclosure of which is hereby incorporated by reference herein in its entirety.

BACKGROUND

The present invention relates to an infrared sensor device using an infrared sensor.

Home electric appliances are known that achieve power saving, or the like, by having a function that operates only when a human body is around. Also in the field of crime-prevention and security, there are products that set off an alarm when detecting invasion of a human body into a target area, and perform various operations.

In such a product, an infrared sensor (mainly, a pyroelectric sensor) is generally used as a sensor for detection of movement of a human body (See Japanese Patent Application Publication number 2009-288498). Japanese Patent Application Publication number 2009-288498 discloses a method in which an infrared attenuation filter is placed in front of a human body detection sensor (infrared sensor), sensitivity of the infrared sensor is controlled by adjusting the infrared attenuation filter, and then a human body detection area is set.

Usually, an infrared sensor generally used for human body detection is used alone. In such a usage, an area where the infrared sensor detects movement of a human body depends on a difference of temperature between a human body and a background. That is, as the human body gets further away from the infrared sensor, or as a difference of temperature between the background in the vicinity of the human body and the human body becomes smaller, a quantity of change of receiving heat quantity of the infrared sensor by the movement of the human body, that is, the sensitivity of the infrared sensor decreases. There is a problem in that an area in which detection of the movement of the human body is performed depends on the difference of temperature between the background in the vicinity of the human body and the human body.

FIG. 31 is a diagram that explains a relationship of the temperature among an infrared sensor, a human body, and a background of a detection area.

An infrared heat quantity Q that is passed to the human body from a target object is expressed by the following Expression 1.

$$Q = \sigma S_1 F_{12} \epsilon_1 \epsilon_2 (T_1^4 - T_2^4) \quad \text{[Expression 1]}$$

In the above Expression 1, $\sigma = 5.67 \times 10^{-8}$ [W·m$^{-2}$·k$^{-4}$] is a Stefan-Boltzmann constant, $S_1$ is a light-receiving area of a sensor, $F_{12}$ is a configuration factor of the sensor to the target object, $T_1$ is a surface temperature of the sensor, $T_2$ is a surface temperature of the target object, $\epsilon_1$ is a radiation coefficient of the sensor, and $\epsilon_2$ is a radiation coefficient of the target object.

Here, as illustrated in a left diagram in FIG. 31, in a case where there is no human body 102 in an infrared-receiving area 104, an infrared sensor 101 receives an infrared heat quantity $Q_1$ expressed by the following Expression 2 from a background 103. And additionally, as illustrated in a right diagram in FIG. 31, in a case where there is a human body 102 in the infrared-receiving area 104, the infrared sensor 101 receives an infrared heat quantity $Q_2$ expressed by the following Expression 3 from the human body 102 and the background 103.

$$Q_1 = \sigma S_1 F_{12}^{(00)} \epsilon_1 \epsilon_2^{(0)} (T_1^4 - T_3^4) \quad \text{[Expression 2]}$$

$$Q_2 = \sigma S_1 F_{12}^{(1)} \epsilon_1 \epsilon_2^{(1)} (T_1^4 - T_2^4) + \sigma S_1 F_{12}^{(01)} \epsilon_1 \epsilon_2^{(0)} (T_1^4 - T_3^4) \quad \text{[Expression 3]}$$

In the above Expressions 2 and 3, $\sigma = 5.67 \times 10^{-8}$ [W·m$^{-2}$·k$^{-4}$] is a Stefan-Boltzmann constant, $S_1$ is a light-receiving area of a sensor, $F_{12}^{(00)}$ is a configuration factor of the sensor to the background, $F_{12}^{(01)}$ is a configuration factor of the sensor to the background, $F_{12}^{(1)}$ is a configuration factor of the sensor to a human body, $\epsilon_1$ is a radiation coefficient of the sensor, $\epsilon_2^{(0)}$ is a radiation coefficient of a background object, $\epsilon_2^{(1)}$ is a radiation coefficient of the human body, $T_1$ is a surface temperature of the sensor, $T_2$ is a surface temperature of the human body (human body temperature), and $T_3$ is a surface temperature of the background (background temperature).

FIG. 32 is a diagram that explains a change of the infrared heat quantity received by the infrared sensor when the human body 102 crosses a sensor detection area of the infrared sensor.

As illustrated in FIG. 32, when the human body 102 comes into a visual field of the infrared sensor 101 (infrared-receiving area 104) from outside, an infrared heat quantity received by the infrared sensor 101 changes from the infrared heat quantity $Q_1$ expressed by the above Expression 2 to the infrared heat quantity $Q_2$ expressed by the above Expression 3.

A value of a quantity of change of the heat quantity $Q_2 - Q_1$ received by the infrared sensor 101 (a quantity of change $Q_2 - Q_1$) depends on two parameters of "a distance between the human body 102 and the infrared sensor 101" and "a difference of temperature between the human body temperature $T_2$ and the background temperature $T_3$ (a difference of temperature $T_2 - T_3$)". Note that the shorter the distance between the human body 102 and the infrared sensor 101 is, the larger the value of the quantity of the change $Q_2 - Q_1$ occurring by the movement of the human body 102 becomes. And additionally, the larger the difference of temperature $T_2 - T_3$ between the human body temperature $T_2$ and the background temperature $T_3$ is, the larger the value of the quantity of the change $Q_2 - Q_1$ becomes.

Generally, the infrared sensor 101 determines that the movement of the human body 102 is detected when the value of the quantity of the change $Q_2 - Q_1$ of the infrared heat quantity exceeds a predetermined threshold value. The value of the quantity of the change $Q_2 - Q_1$, as described above, is dependent on "the distance between the human body 102 and the infrared sensor 101" and "the difference of temperature between the human body temperature $T_2$ and the background temperature $T_3$".

Therefore, if the threshold value of the quantity of the change $Q_2 - Q_1$ is uniquely determined, it is obvious that the infrared-receiving area 104 in which the infrared sensor 101 detects the movement of the human body 102 depends on the difference of temperature $T_2 - T_3$ between the human body temperature $T_2$ and the background temperature $T_3$. That is, when the difference of the temperature $T_2 - T_3$ changes, the size of the infrared-receiving area 104 in which the infrared sensor 101 detects the movement of the human body 102 also changes.

FIG. 33 is a diagram that explains a state where the size of a sensor detection area changes due to change of the difference of temperature between the human body temperature $T_2$ and the background temperature $T_3$.

As illustrated in FIG. 33, for example, an infrared-receiving area 104a when the difference of the temperature $T_2 - T_3 = 5$ degrees C. becomes larger than an infrared-receiving area 104b when the difference of temperature $T_2 - T_3 = 3$ degrees C.

Thus, as to a conventional infrared sensor device, the size of the sensor detection area changes due to the change of the difference of temperature between the human body temperature and the background temperature. Note that modularization of a temperature sensor and the infrared sensor in order to detect the background temperature around the human body, and control of a signal amplification factor of the infrared sensor in accordance with the background temperature detected by the temperature sensor make it possible to keep the detection area of the movement of the human body constant. However, in this case, a location where the module is placed has to have the same temperature as that in the background. For example, in a case where the module is placed on a heat-generating object, there is a problem in that it is not possible to precisely detect the background temperature around the human body.

The above problem occurs not only in an infrared sensor for human body detection, but also in an infrared sensor for detection of movement of an object having a certain temperature difference between a background and the object. That is, even in a case where the movement of the object occurs outside a desired distance range from the infrared sensor, due to the size of the difference of temperature between the object and the background, the conventional infrared sensor may mistakenly determine that the movement of the object occurs in the desired distance range from the infrared sensor.

SUMMARY

An objective of the present invention is to provide an infrared sensor that determines whether movement of an object occurs in a detection area of a desired distance range from the infrared sensor or not, regardless of a difference of temperature between the object and a background.

In order to achieve the above objective, an embodiment of the present invention provides an infrared sensor device comprising: a plurality of infrared sensors that is provided in a plurality of divided areas in which an infrared-receiving area is radially divided in one plane; a detector that detects presence or absence of movement of an object in the infrared-receiving area for each of the divided areas based on an output of the infrared sensor; and a determiner that determines whether the object is in a detection area in a predetermined distance range from the infrared sensor, based on an arrangement pattern of the divided areas in which the movement of the object is detected, in an alignment of the divided areas in the infrared-receiving areas.

DETAILED DESCRIPTION OF THE PREFERRED EMBODIMENTS

Figure 1:
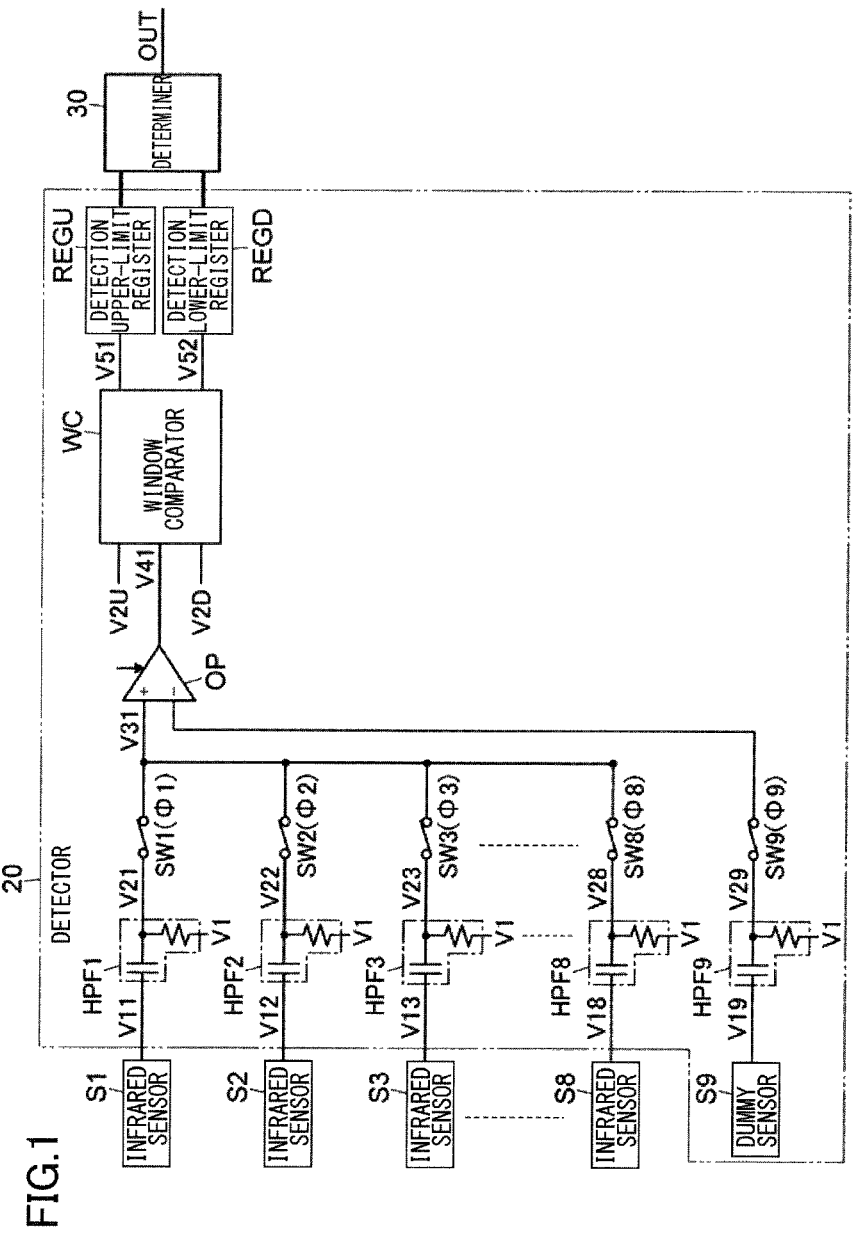
FIG. 1 is a diagram that explains an example according to an embodiment of the present invention.
Figure 2:
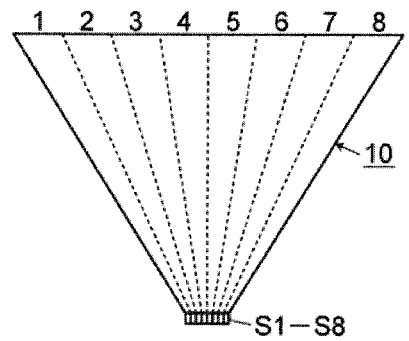
FIG. 2 is a diagram that explains a plurality of divided areas in which an infrared-receiving area in the example is radially divided in one plane.

FIG. 1 is a diagram that explains an example according to an embodiment of the present invention. FIG. 2 is a diagram that explains a plurality of divided areas in which an infrared-receiving area in the example is radially divided in one plane.

Infrared sensors S1-S8 are arranged in a line. The infrared sensors S1-S8 have equally-spaced and exclusive visual fields. That is, the infrared sensors S1-S8 do not have common visual fields to each other.

As illustrated in FIG. 2, an infrared-receiving area 10 is radially divided into a plurality of divided areas 1-8 in a plane viewed from above. The divided areas 1-8 are areas in which the infrared sensors S1-S8 receive infrared. Reference numbers of the divided areas 1-8 correspond to numbers of reference signs of the infrared sensors S1-S8.

A detector 20 and a determiner 30 are provided. The detector 20 detects presence or absence of movement of an object in the infrared-receiving area 10, based on outputs of the infrared sensors S1-S8 for each of the divided areas 1-8. The determiner 30 determines whether a moving object is in a detection area of a predetermined distance range from the infrared sensors S1-S8, based on an arrangement pattern of divided areas in which movement of the object is detected by the detector 20, in an alignment of the divided areas 1-8 in the infrared-receiving area 10.

The detector 20 includes a dummy sensor S9, high-pass filters HPF1-HPF9, switches SW1-SW9, an amplifier OP, a window comparator WC, a detection upper-limit register REGU, and a detection lower-limit register REGD.

The dummy sensor S9 has the same constitution as that of the infrared sensors S1-S8. Additionally, in the dummy sensor S9, reception of infrared from the infrared-receiving area 10 is blocked.

The high-pass filters HPF1-HPF9 are provided corresponding to the infrared sensors S1-S8 and the dummy sensor S9, respectively. To the high-pass filters HPF1-HPF9, output voltages V11-V19 of the infrared sensor S1-S8 and the dummy sensor S9 are inputted, respectively.

The switches SW1-SW8 switch the high-pass filters HPF1-HPF8 in a time-division multiplex manner to input output voltages V21-V28 of the high-pass filters HPF1-HPF8 as an output voltage V31 to a non-inverting input terminal (+) of the amplifier OP. The switch SW9 switches an input and a block of an output voltage V29 of the high-pass filter HPF9 to an inverting input terminal (−) of the amplifier OP.

The amplifier OP amplifies a voltage difference between the output voltages V21-V28 of the high-pass filters HPF1-HPF8 connected to the infrared sensors S1-S8 corresponding to the divided areas 1-8 and the output voltage V29 of the high-pass filter HPF9 connected to the dummy sensor S9. That is, the amplifier OP amplifies a voltage difference between the output voltage V31 and the output voltage V29.

The window comparator WC outputs a signal (for example, H signal) that indicates that the movement of the object is detected corresponding to the divided areas 1-8, when an output voltage V41 of the amplifier OP is larger than a detection upper-limit voltage (V2U), or less than a detection lower-limit voltage (V2D). And the window comparator WC outputs a signal (for example, L signal) that indicates that the movement of the object is not detected corresponding to the divided areas 1-8, when the output voltage 41 is less than or equal to the detection upper-limit voltage, or equal to or more than the detection lower-limit voltage. A signal regarding the detection upper-limit voltage is outputted as an output signal V51. A signal regarding the detection lower-limit voltage is outputted as an output signal V52.

The detection upper-limit register REGU stores a signal of the window comparator WC as the output signal 51 corresponding to the divided areas 1-8. The detection lower-limit register REGD stores a signal of the window comparator WC as the output signal V52 corresponding to the divided areas 1-8.

The determiner 30 determines whether the object is in the detection area of the predetermined distance range from the infrared sensors S1-S8 or not, based on an arrangement pattern of H signals stored in the registers REGU and REGD. That is, the determiner 30 performs the above determination based on an arrangement pattern of divided areas in which the movement of the object is detected by the detector 20 in the alignment of the divided areas 1-8 in the infrared-receiving area 10.

An infrared sensor device in the present example amplifies signals based on output signals of the infrared sensors S1-S8, and determines the presence or absence of the movement of the object in the infrared-receiving area 10 by processing those. A case where a human body as an object moves in front of an infrared sensor is taken as an example, and operation in the present example will be explained below.

Figure 32:
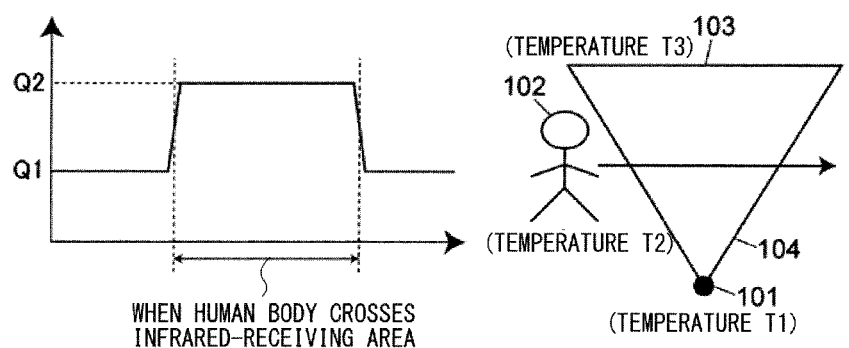
FIG. 32 is a diagram that illustrates change of an infrared heat quantity received by an infrared sensor when a human body crosses a sensor detection area of the infrared sensor.
Figure 33:
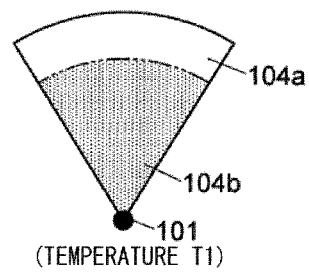
FIG. 33 is a diagram that explains a state where the size of a sensor detection area changes due to a change of a difference of temperature between human body temperature $T_2$ and background temperature $T_3$.

Each of the infrared sensors S1-S9 is a thermal infrared sensor that outputs a voltage depending on a sensor element temperature. Change of the output voltage of each of the infrared sensors S1-S8 when a human body passes the divided areas 1-8 is the same as change of a heat quantity illustrated in FIG. 32.

Figure 3:
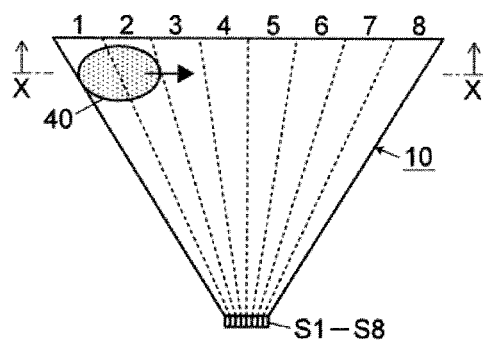
FIG. 3 is a diagram that schematically illustrates a state where a human body is in an infrared-receiving area.
Figure 4:
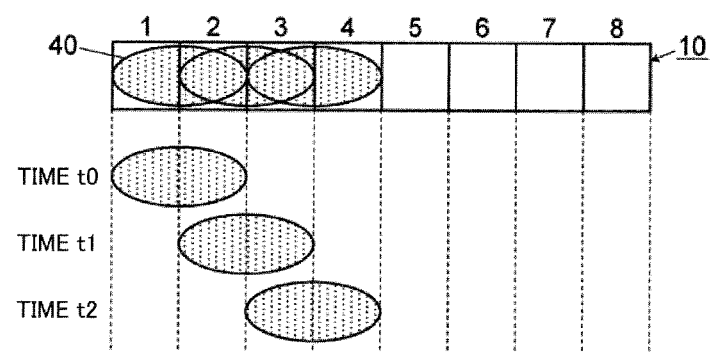
FIG. 4 is a diagram that illustrates a schematic cross-section in an X-X position in FIG. 3, and a relationship between positions of the human body that moves in the cross-section and time.
Figure 5:
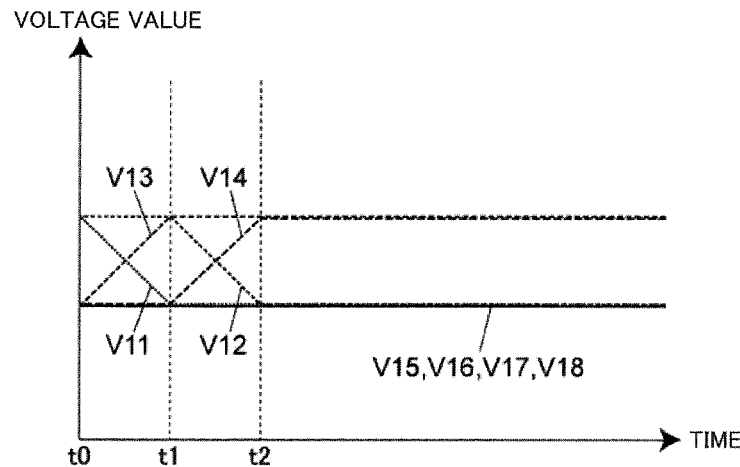
FIG. 5 is a diagram that illustrates a relationship between output voltages V11-V18 of infrared sensors S1-S8 and time during the time from a time t0 to a time t2 in FIG. 4.
Figure 6:
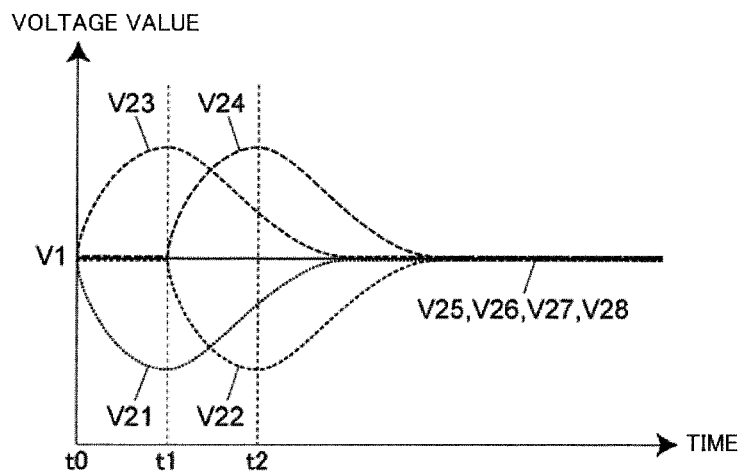
FIG. 6 is a diagram that illustrates a relationship between output voltages V21-V28 of high-pass filters HPF1-HPF8 and time during the time from the time t0 to the time t2 in FIG. 4.

FIG. 3 is a diagram that schematically illustrates a state where a human body 40 is in the infrared-receiving area 10. FIG. 4 is a diagram that illustrates a schematic cross-section in an X-X position in FIG. 3, and a relationship between positions of the human body 40 that moves in the cross-section and time. FIG. 5 is a diagram that illustrates a relationship between the output voltages V11-V18 of the infrared sensors S1-S8 and time during the time from a time t0 to a time t2 in FIG. 4. FIG. 6 is a diagram that illustrates a relationship between the output voltages V21-V28 of the high-pass filters HPF1-HPF8 and time during the time from the time t0 to the time t2 in FIG. 4. Note that in FIG. 5, in positions where voltages V11-V18 are overlapped, slightly shifted lines are illustrated so as to easily recognize each voltage. This applies to the voltages V25-V28 in FIG. 6, too.

In a state of FIG. 3, the human body 40 is just positioned across the divided areas 1 and 2. In this state, only the infrared sensors S1 and S2 receive infrared from the human body 40. Consider a state where the human body 40 moves from the position in FIG. 3 in a direction of an arrow to a position where the human body 40 is positioned across the divided areas 3 and 4.

As illustrated in FIG. 4, the time when the human body 40 is positioned in only the divided areas 1 and 2 is taken as a time t0. The time when the human body 40 is positioned in only the divided areas 2 and 3 is taken as a time t1. The time when the human body 40 is positioned in only the divided areas 3 and 4 is taken as a time t2.

When the human body 40 moves from a position at the time t0 to a position at the time t2, chronological changes of the output voltages V11-V18 of the infrared sensors 1-8 are as illustrated in FIG. 5. In particular, in a range from the time t0 to the time t1, a ratio of the human body 40 in a visual field of the infrared sensor S1 decreases monotonously, as time elapses. At the time t1, the human body 40 does not exist completely in the visual field of the infrared sensor S1. Therefore, the output voltage V11 of the infrared sensor S1 decreases monotonously from the time t0 to the time t1, and then does not change after the time t1.

Additionally, in the range from the time t0 to the time t1, a ratio of the human body 40 in a visual field of the infrared sensor S2 hardly changes. Therefore, the output voltage V12 of the infrared sensor S2 hardly changes, too. Considering the above, in the range from the time t0 to the time t2, it can be seen that the chronological changes of the output voltages V11-V18 of the infrared sensors S1-S8 are as illustrated in FIG. 5.

Immediately behind the infrared sensors S1-S8, high-pass filters HPF1-HPF8, a cutoff frequency of which is approximately 1 Hz, for example, are placed. When the output voltages V11-V18 of the infrared sensors S1-S8 change in the direction of increasing, the output voltages V21-V28 of the high-pass filters HPF1-HPF8 change in the direction of increasing based on a value of a voltage V1.

To the contrary, when the output voltages V11-V18 of the infrared sensors S1-S8 change in the direction of decreasing, the output voltages V21-V28 of the high-pass filters HPF1-HPF8 change in the direction of decreasing based on the value of the voltage V1. In addition, when the output voltages V11-V18 remain the same, the output voltages V21-V28 of the high-pass filters HPF1-HPF8 change to be equal to the value of the voltage V1.

Consider the output voltage V21 of the high-pass filter HPF1 with reference to FIGS. 5 and 6. From the time t1 to the time t1, the output voltage V11 of the infrared sensor S1 changes in the direction of decreasing. Therefore, the output voltage V21 of the high-pass filter HPF1 changes in the direction of decreasing from the time t0 to the time t1.

In addition, the output voltage V11 of the infrared sensor S1 does not change after the time t1. Therefore, after the time t1, the output voltage V21 of the high-pass filter HPF1 gradually returns to the value of voltage V1 in accordance with a time constant of a high-pass filter.

Considering the output voltages V22-V28 of the high-pass filters HPF2-HPF8 as well as the above, chronological changes of the output voltages V22-V28 of the high-pass filters HPF2-HPF8 are as illustrated in FIG. 6.

Figure 7:
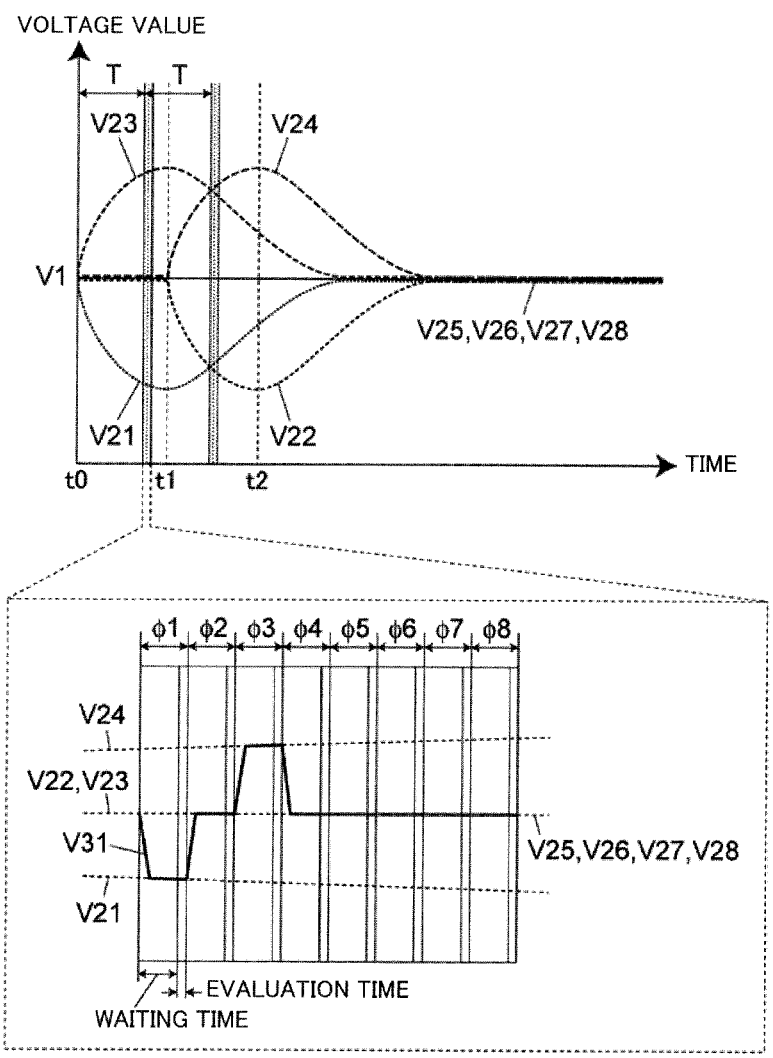
FIG. 7 is a diagram that illustrates a chronological change of an output voltage V31 when output voltages V22-V28 of high-pass filters HPF1-HPF8 are time-division multiplexed.
Figure 8:
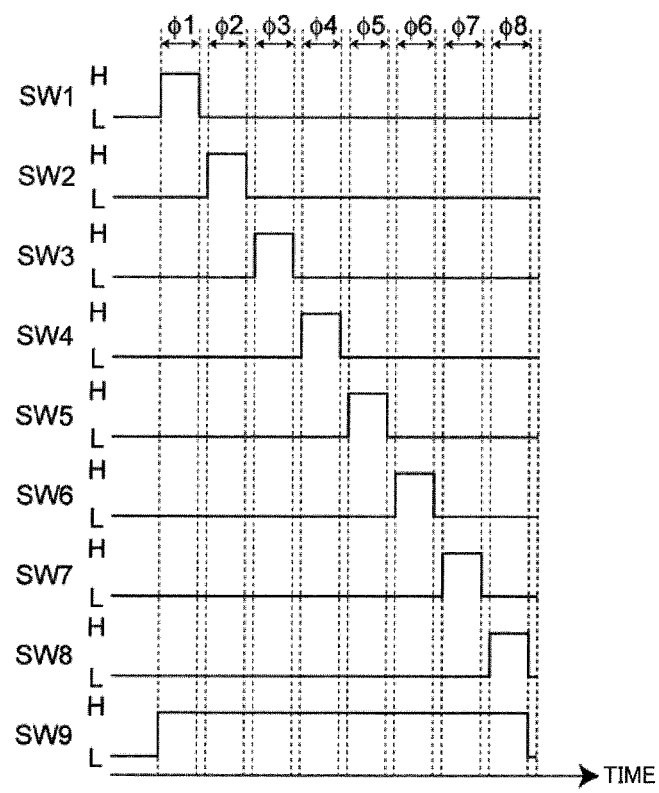
FIG. 8 is a diagram that explains timings of switching switches SW1-SW9.

FIG. 7 is a diagram that illustrates a chronological change of an output voltage V31 when the output voltages V22-V28 of the high-pass filters HPF1-HPF8 are time-division multiplexed. FIG. 8 is a diagram that explains timings of switching switches SW1-SW9.

As illustrated in an upper diagram in FIG. 7, when a time T passes from the time t1, for example, firstly, the switches SW1 and SW9 are in an on-state. At this time, the switches SW2-SW8 are in an off-state. A time period when the switches SW1 and SW9 are in the on-state is taken as a time period φ1. In the time period φ1, as illustrated in a lower diagram in FIG. 7, the output voltage 31 becomes equal to the output voltage 21 (also see FIG. 1).

When the switch SW1 keeps the on-state for a certain amount of time (when the time period φ1 is over), the switch SW1 is turned off, and then the switch SW2 is turned on. At this time, the switch SW9 is in the on-state. The switches SW1, and SW3-S8 are in the off-state. A time period when the switches SW2 and SW9 are in the on-state is taken as a time period φ2. In the time period φ2, as illustrated in the lower diagram in FIG. 7, the output voltage V31 becomes equal to the output voltage V22 (also see FIG. 1).

As the output voltage V31, the output voltages V21-V28 are applied in order. Those states are illustrated in the lower diagram in FIG. 7. Between the time period φ1 and a time period φ8, timings of on-states and off-states of the switches SW1-SW9 are illustrated in FIG. 8. Each of the switches SW1-SW9 is in the on-state at the time of H, and keeps the off-state at the time of L.

A voltage difference between the output voltages V21-V28 of the high-pass filters HPF1-HPF8, and the output voltage V29 of the high-pass filter HPF9 is time-division multiplexed for each certain amount of time T, and then amplified by the amplifier OP. It is preferable that the amplifier OP include an auto-zero function, in order to prevent amplifying an input offset of the amplifier OP concurrently.

Figure 9:
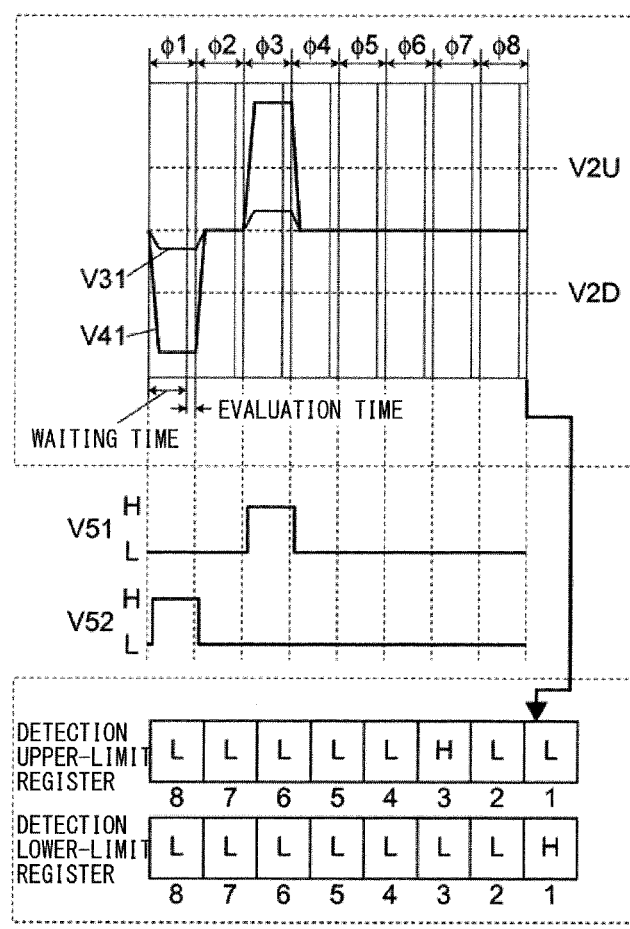
FIG. 9 is a diagram that illustrates chronological changes of an output voltage V41 of an amplifier and output signals V51 and V52 of a window comparator, and signals stored in a detection upper-limit register and a detection lower-limit register when a series of evaluations is finished.

FIG. 9 is a diagram that illustrates chronological changes of the output voltage V41 of the amplifier OP and the output signals V51 and V52 of the window comparator WC, and signals stored in the detection upper-limit register REGU and the detection lower-limit register REGD when a series of evaluations is finished.

The output voltage V41 of the amplifier OP refers to a voltage difference between the output voltage 31 and the output voltage V29 being amplified (see an upper diagram in FIG. 9). The output voltage V41 is inputted to the window comparator WC. The window comparator WC outputs the output signal V51 regarding the detection upper-limit voltage, and the output signal V52 regarding the detection lower-limit voltage.

As illustrated in FIG. 9, when the output voltage V41 exceeds the detection upper-limit voltage V2U, the window comparator WC outputs an H signal as the output signal V51 and an L signal as the output signal V52. And when the output voltage V41 is below a detection lower-limit voltage V2D, the window comparator WC outputs the L signal as the output signal V51 and the H signal as the output signal V52. In a case where the output voltage 41 is between the detection upper-limit voltage V2U and the detection lower-limit voltage V2D, the window comparator WC outputs the L signal as both of the output signals V51 and V52.

The output signal V51 (H signal or L signal) is stored in the detection upper-limit register REGU. The output signal V52 (H signal or L signal) is stored in the detection lower-limit register REGD. Here, each of the detection upper-limit register REGU and the detection lower-limit register REGD has an 8-bit structure. In each of the detection upper-limit register REGU and the detection lower-limit register REGD, one of a series of evaluation results regarding the divided areas 1-8 is stored.

Data stored in the detection upper-limit register REGU and the detection lower-limit register REGD is inputted to the determiner 30. The determiner 30 determines whether the human body 40 exists in the detection area of the predetermined distance range of the infrared-receiving area 10 or not based on an arrangement pattern of H signals in those data. That is, the determiner 30 performs determination based on an arrangement pattern of divided areas in which movement of an object is detected by the detector 20 in the alignment of the divided areas 1-8 in the infrared-receiving area 10.

Next, an example of a determination operation of the determiner 30 will be explained.

Figure 10:
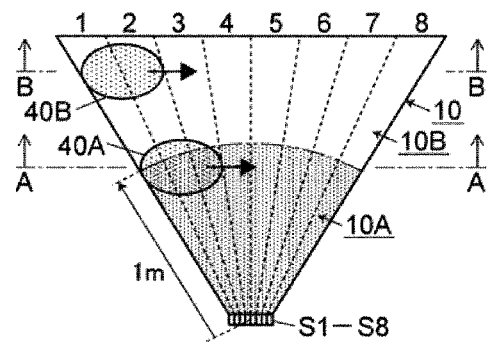
FIG. 10 is a diagram that illustrates an example of a detection area that is positioned in a predetermined distance range from an infrared sensor in an infrared-receiving area.

FIG. 10 is a diagram that illustrates an example of a detection area that is positioned in a predetermined distance range from an infrared sensor of an infrared-receiving area in an infrared-receiving area.

For example, a detection area 10A is set in a range within 1 m from the infrared sensors S1-S8. In a case where movement of a human body is detected in the detection area 10A, a visual field of the infrared sensors S1-S8 is adjusted such that the human body is just positioned across a plurality of divided areas (divided areas 1-3 in FIG. 10) when the human body exists in a point approximately 1 m away from the infrared sensors S1-S8 (see a human body 40A in FIG. 10).

By placing an optical lens or the like in front of the infrared sensors S1-S8, the visual field of the infrared sensors S1-S8 can be arbitrarily adjusted. Note that in FIG. 10, each of reference signs 40A and 40B denotes a human body. Since a head of a human body is not covered with clothing or the like, for detection of the movement of the human body, movement of the head of the human body is detected, generally. In FIG. 10, the human body 40B is positioned in an infrared-receiving area 10B outside the detection area 10A.

Figure 11:
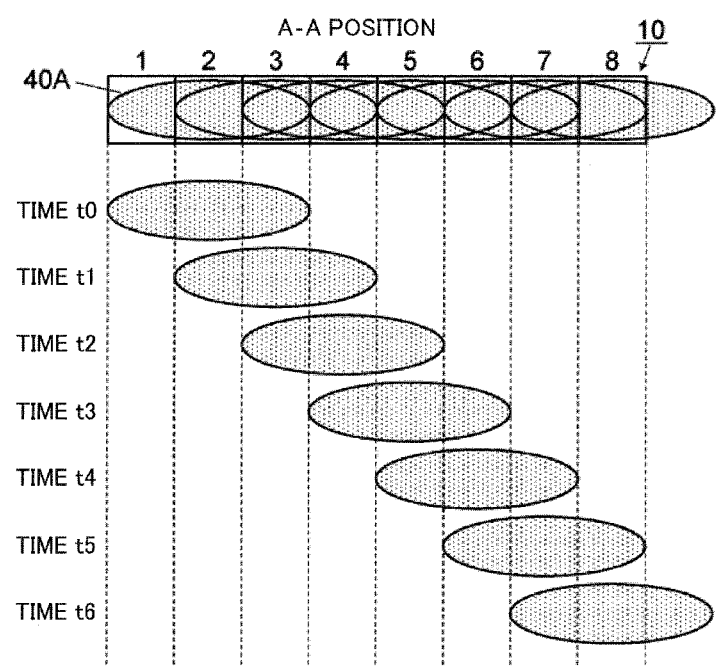
FIG. 11 is a diagram that illustrates a schematic cross-section in an A-A position in FIG. 10, and a relationship between positions of a human body 40A that moves in the cross-section and time.
Figure 12:
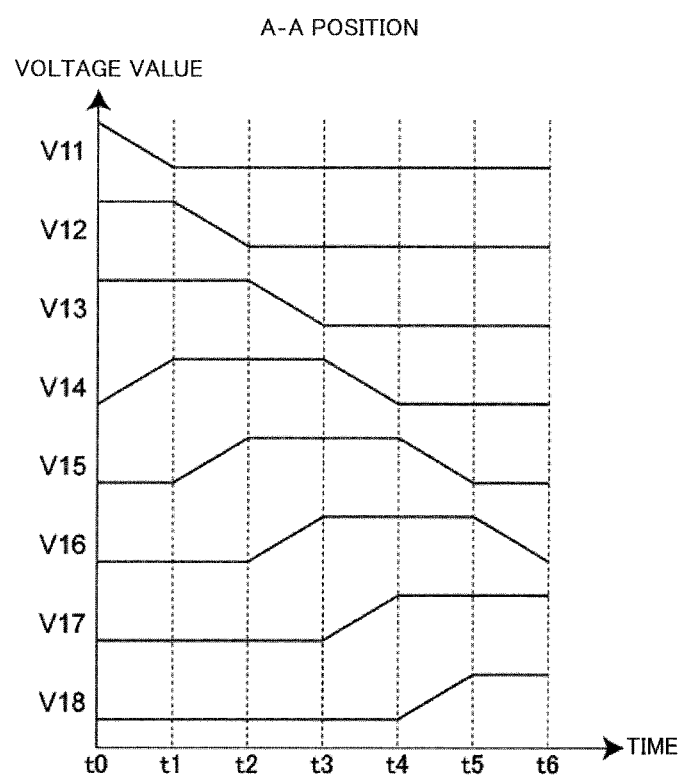
FIG. 12 is a diagram that illustrates a relationship between output voltages V11-V18 of infrared sensors S1-S8 and time during the time from a time t0 to a time t6 in FIG. 11.
Figure 13:
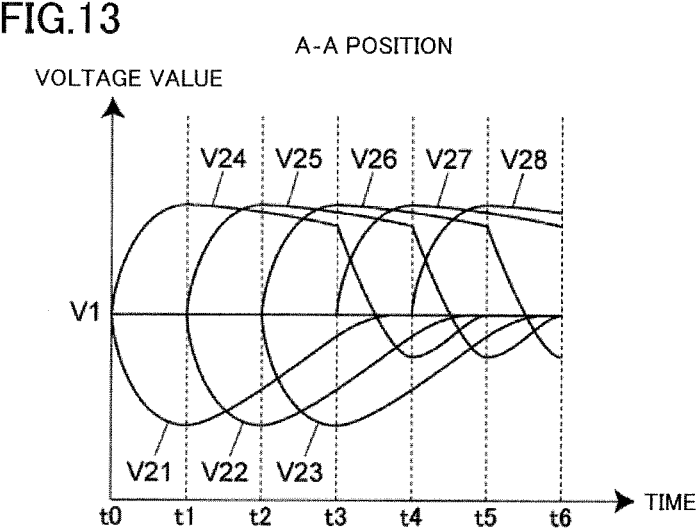
FIG. 13 is a diagram that illustrates a relationship between output voltages V21-V28 of high-pass filters HPF1-HPF8 and time during the time from the time t0 to the time t6 in FIG. 11.

FIG. 11 is a diagram that illustrates a schematic cross-section in an A-A position in FIG. 10, and a relationship between positions of the human body 40A that moves in the cross-section and time. FIG. 12 is a diagram that illustrates a relationship between output voltages V11-V18 of the infrared sensors S1-S8 and time during the time from a time t0 to a time t6 in FIG. 11. FIG. 13 is a diagram that illustrates a relationship between output voltages V21-V28 of the high-pass filters HPF1-HPF8 and time during the time from the time t0 to the time t6 in FIG. 11.

In a state in FIG. 10, the human body 40A is just positioned across the divided areas 1, 2, and 3. In this state, only the infrared sensors S1, S2, and S3 receive infrared from the human body 40A. In a case where the human body 40A moves in the direction of an arrow from a position in FIG. 10 during the time from the time t0 to the time t6 in FIG. 11, chronological changes of the output voltages V11-V18 of the infrared sensors S1-S8 are as shown in FIG. 12. Additionally, chronological changes of the output voltages V21-V28 of the high-pass filters HPF1-HPF8 are as shown in FIG. 13.

Figure 14:
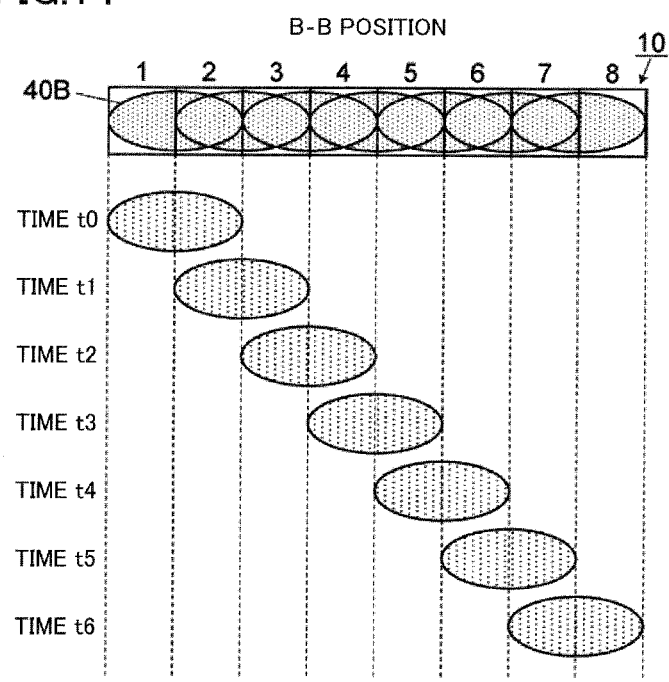
FIG. 14 is a diagram that illustrates a schematic cross-section in a B-B position in FIG. 10, and a relationship between positions of a human body 40B that moves in the cross-section and time.
Figure 15:
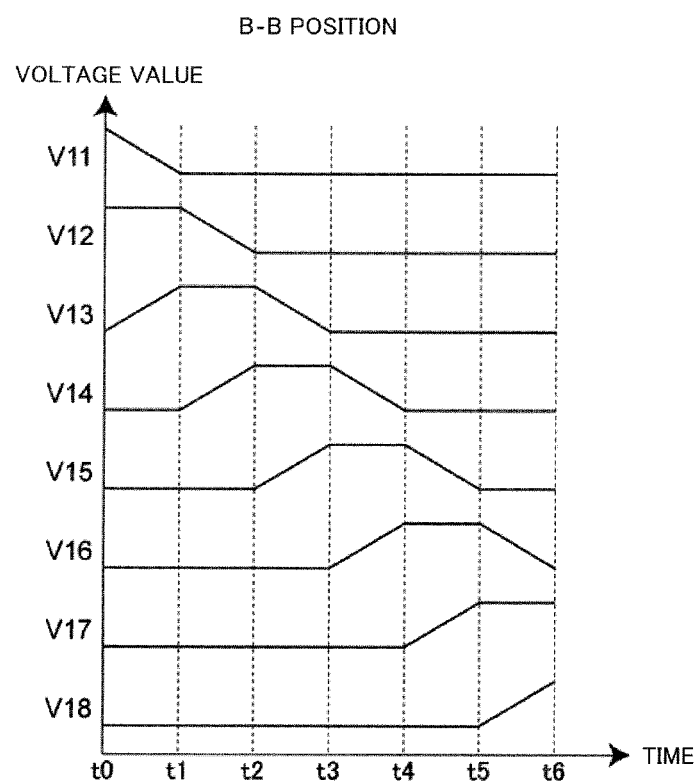
FIG. 15 is a diagram that illustrates a relationship between output voltages V11-V18 of infrared sensors S1-S8 and time during the time from a time t0 to a time t6 in FIG. 14.
Figure 16:
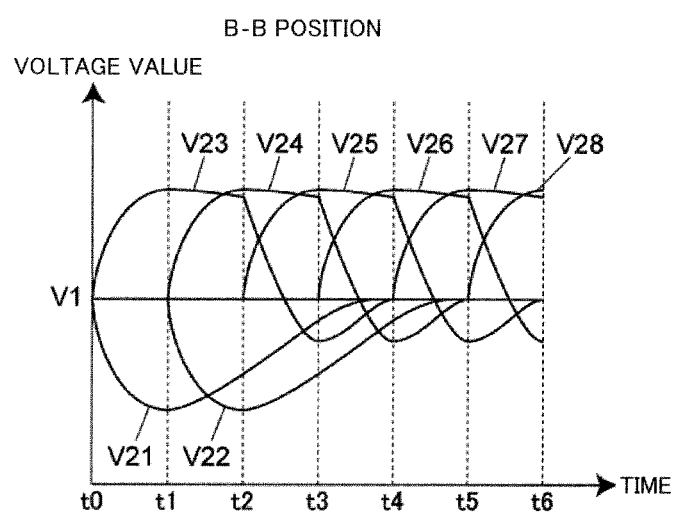
FIG. 16 is a diagram that illustrates a relationship between output voltages V21-V28 of high-pass filters HPF1-HPF8 and time during the time from the time t0 to the time t6 in FIG. 14.

FIG. 14 is a diagram that illustrates a schematic cross-section in a B-B position in FIG. 10, and a relationship between positions of the human body 40B that moves in the cross-section and time. FIG. 15 is a diagram that illustrates a relationship between the output voltages V11-V18 of the infrared sensors S1-S8 and time during the time from a time t0 to a time t6 in FIG. 14. FIG. 16 is a diagram that illustrates a relationship between the output voltages V21-V28 of the high-pass filters HPF1-HPF8 and time during the time from the time t0 to the time t6 in FIG. 14.

In a state in FIG. 10, the human body 40B is positioned across the divided areas 1 and 2. In this state, only the infrared sensors S1 and S2 receive infrared from the human body 40B. Consider that the human body 40B moves in the direction of an arrow from a position in FIG. 10 during the time from the time t0 to the time t6 as illustrated in FIG. 14. At this time, chronological changes of the output voltages V11-V18 of the infrared sensors S1-S8 are as shown in FIG. 15. Additionally, chronological changes of the output voltages of the high-pass filters HPF1-HPF8 are as shown in FIG. 16.

Figure 17:
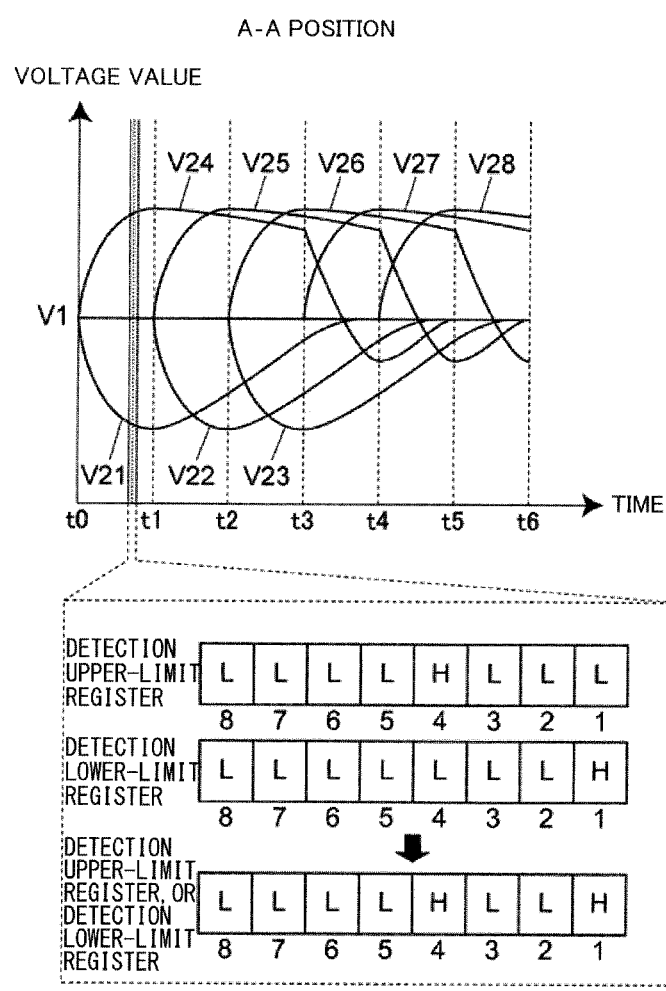
FIG. 17 is a diagram that illustrates signals stored in a detection upper-limit register and a detection lower-limit register when a series of evaluations for output voltages of infrared sensors S1-S8 between a time t0 and a time t1 is finished with respect to the human body 40A in FIG. 10.
Figure 18:
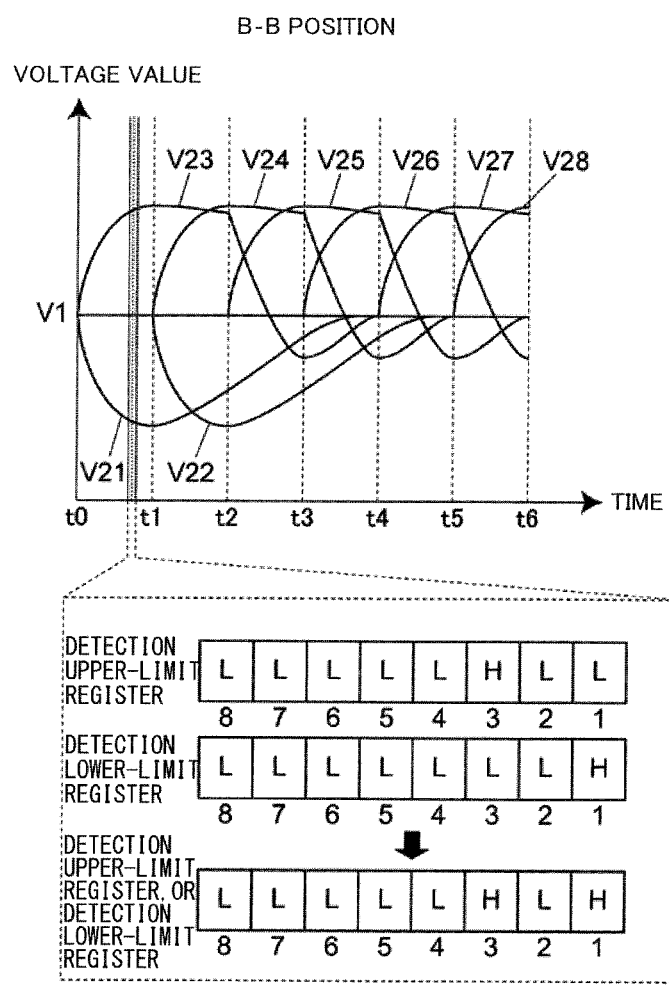
FIG. 18 is a diagram that illustrates signals stored in a detection upper-limit register and a detection lower-limit register when a series of evaluations for output voltages of infrared sensors S1-S8 is finished between the time t0 and the time t1 with respect to the human body 40B in FIG. 10.

FIG. 17 is a diagram that illustrates signals stored in a detection upper-limit register and a detection lower-limit register when a series of evaluations for the output voltages of the infrared sensors S1-S8 between the time t0 and the time t1 is finished with respect to the human body 40A in FIG. 10. FIG. 18 is a diagram that illustrates signals stored in a detection upper-limit register and a detection lower-limit register when a series of evaluations for the output voltages of the infrared sensors S1-S8 between time t0 and time t1 is finished with respect to the human body 40B in FIG. 10.

Firstly, consider the human body 40A. As illustrated in FIG. 10, at the time to, the human body 40A is just positioned across three divided areas 1, 2, and 3. Therefore, when a series of amplification and conversion operations is performed by the time t1 from the time t0, as illustrated in FIG. 17, in the detection lower-limit register REGD, in order of the divided areas 1-8, H, L, L, L, L, L, L, and L signals are stored. And in the detection upper-limit register REGU, in order of the divided areas 1-8, L, L, L, H, L, L, L, and L signals are stored. Here, each of the divided areas 1 and 4, where the H signal is presented, is a divided area where the movement of the human body 40A has been detected.

When the determiner 30 performs an OR operation, with respect to the detection upper-limit register REGU and the detection lower-limit register REGD, for each bit (for each of the divided areas 1-8), in order of the divided areas 1-8, a signal arrangement pattern of H, L, L, H, L, L, L, and L is obtained. Since the human body 40A is just positioned across three divided areas of the divided areas 1-8, if a series of the amplification and conversion operations is performed by the time t1 from the time t1, the determiner 30 obtains a signal arrangement pattern in which two L signals are inserted between H signals.

Next, consider the human body 40B. As illustrated in FIG. 10, at the time to, the human body 40B is just positioned across two divided areas 1, and 2. Therefore, when a series of amplification and conversion operations is performed by the time t1 from the time t0, as illustrated in FIG. 18, in the detection lower-limit register REGD, in order of the divided areas 1-8, H, L, L, L, L, L, L, and L signals are stored. And in the detection upper-limit register REGU, in order of the divided areas 1-8, L, L, H, L, L, L, L, and L signals are stored. Here, each of the divided areas 1 and 3, where the H signal is presented, is a divided area where the movement of the human body 40B has been detected.

When the determiner 30 performs an OR operation, with respect to the detection upper-limit register REGU and the detection lower-limit register REGD, for each bit, in order of the divided areas 1-8, a signal arrangement pattern of H, L, H, L, L, L, L, and L is obtained. Since the human body 40B is just positioned across two divided areas of the divided areas 1-8, if a series of the amplification and conversion operations is performed by the time t1 from the time t1, the determiner 30 obtains a signal arrangement pattern in which one L signal is inserted between H signals.

Thus, as is clear from examples of the human body 40A and human body 40B, from the number of L signals inserted between H signals, it is possible to recognize how distant a position where a human body moves is from the infrared sensors S1-S8. In the present example, the detection area 10A of movement of the human body is within 1 m from the infrared sensors S1-S8, and therefore, in the above examples, if the number of L signals inserted between two H signals is equal to or more than two, the human body moves in the detection area 10A.

That is, the present example that employs a method of recognizing a distance from the infrared sensors S1-S8 to the human body by obtaining the number of L signals inserted between two L signals makes it possible to solve a problem in that a range of a detection area changes due to a difference of a surface temperature between a background and a human body.

When a difference of temperature between a background and a human body is large, only a quantity of change of the output voltages V21-V28 becomes large, and the number of the L signals inserted between the two H signals does not change. That is, if there is a sufficient difference of temperature between the background and the human body to exceed the detection upper-limit voltage V2U and the detection lower-limit voltage V2D, the range of the detection area 10A does not change due to the difference of the surface temperature between the background and the human body.

In addition, in the present example, the high-pass filters HPF1-HPF8 are placed immediately behind the infrared sensors S1-S8. The output signals V21-V28 of the high-pass filters HPF1-HPF8 become a voltage V1, when there is no human body in the visual field (infrared-receiving area 10) of the infrared sensors S1-S8, or when the human body stands still. The output signals V21-V28 change with respect to the value of the voltage V1, only when the human body moves in the infrared-receiving area 10.

That is, the high-pass filters HPF1-HPF8 are placed immediately behind the infrared sensors S1-S8, and therefore, it is possible to reliably detect only the movement of the human body (movement of the object). Thus, it is possible to remove influences of a DC (direct current) offset specific to an infrared sensor, and irregularity of a background temperature.

The above is summarized below. A circuit is considered in which a plurality of infrared sensors is arranged in a line, a dummy sensor is arranged, high-pass filters are arranged at outputs of the infrared sensors and the dummy sensor, respectively, and a voltage difference of the infrared sensors and the dummy sensor is amplified. In a circuit construction in which when the amplified voltage difference exceeds a certain voltage value, an H signal is outputted, and when the amplified voltage difference is below a certain voltage value, an L signal is outputted and binarized, by the time a human body moves just for one bit (for one divided area), a series of conversion and evaluation operations is performed.

With respect to signal information stored in a detection upper-limit register and a detection lower-limit register obtained by the evaluation operation, an OR operation is performed for each bit. With respect to the obtained signal information, determination whether the human body moves in the detection area of the infrared sensor or not is made by the number of L signals inserted between two H signals. A problem in that a detection range changes due to a difference of temperature of a background and the human body is solved by a method of recognizing a distance between the human body and the infrared sensor by the L signals inserted between the two H signals.

In the above example of the determination operation of the determiner 30, a case where the human body 40A or the human body 40B stands still in the infrared-receiving area 10 of the infrared sensors S1-S8 in an initial state (time t0) has been considered.

Next, consider a case where in the initial state the human body is outside the infrared-receiving area 10 of the infrared sensors S1-S8, and then moves in the infrared-receiving area 10.

Figure 19:
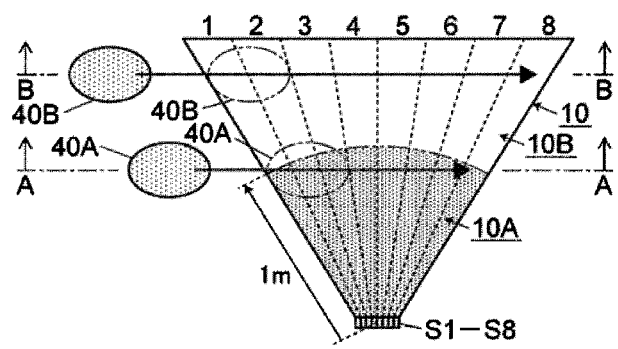
FIG. 19 is a diagram that illustrates a state where the human bodies 40A, and 40B are positioned outside the infrared-receiving area.
Figure 20:
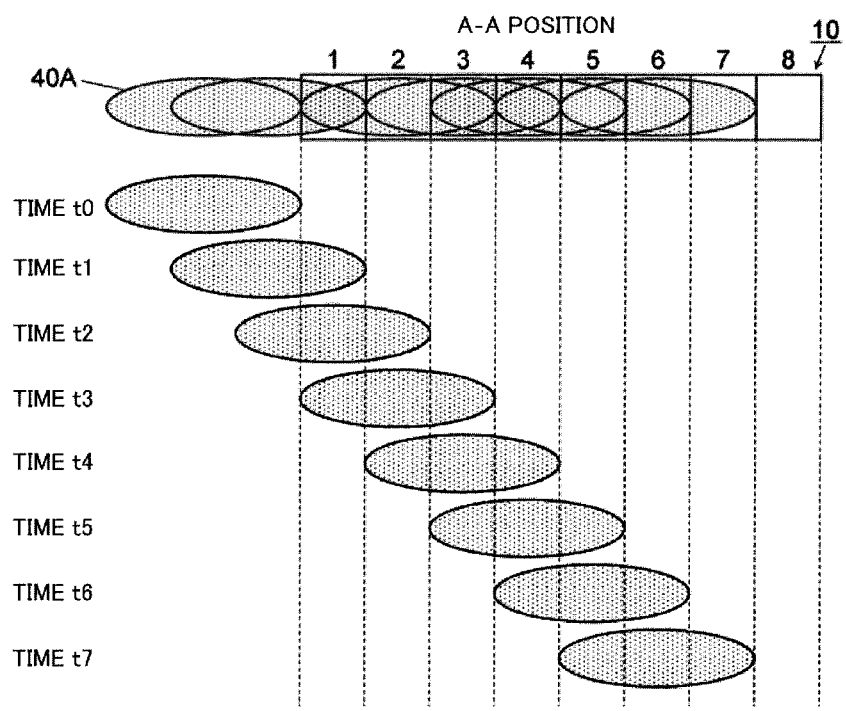
FIG. 20 is a diagram that illustrates a schematic cross-section in an A-A position in FIG. 19, and a relationship between positions of a human body 40A that moves in the cross-section and time.
Figure 21:
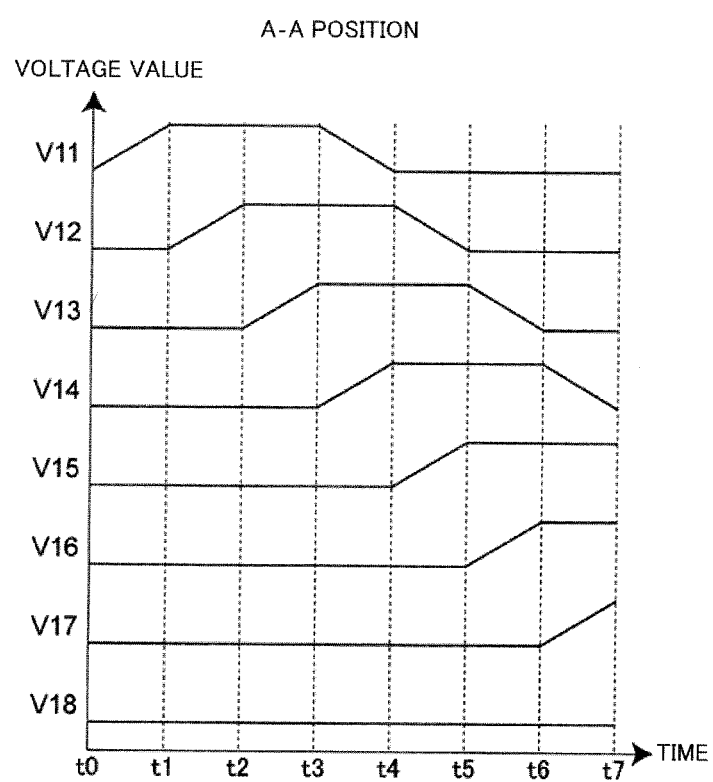
FIG. 21 is a diagram that illustrates a relationship between output voltages V11-V18 of infrared sensors HPF1-HPF8 and time during the time from a time t0 to a time t7 in FIG. 20.
Figure 22:
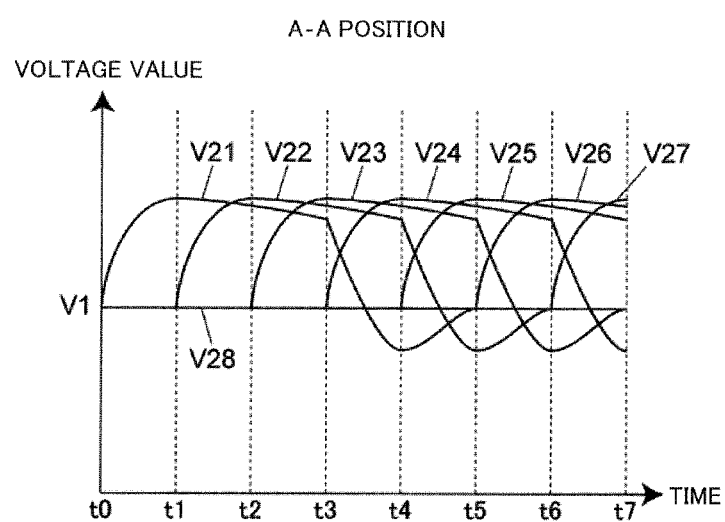
FIG. 22 is a diagram that illustrates a relationship between output voltages V21-V28 of high-pass filters HPF1-HPF8 and time during the time from time the t0 to the time t7 in FIG. 20.

FIG. 19 is a diagram that illustrates a state where the human bodies 40A, and 40B are positioned outside the infrared-receiving area. FIG. 20 is a diagram that illustrates a schematic cross-section in an A-A position in FIG. 19, and a relationship between positions of the human body 40A that moves in the cross-section and time. FIG. 21 is a diagram that illustrates a relationship between the output voltages V11-V18 of the infrared sensors S1-S8 and time during the time from a time t0 to a time t7 in FIG. 20. FIG. 22 is a diagram that illustrates a relationship between the output voltages V21-V28 of the high-pass filters HPF1-HPF8 and time during the time from the time t0 to the time t7 in FIG. 20.

Figure 23:
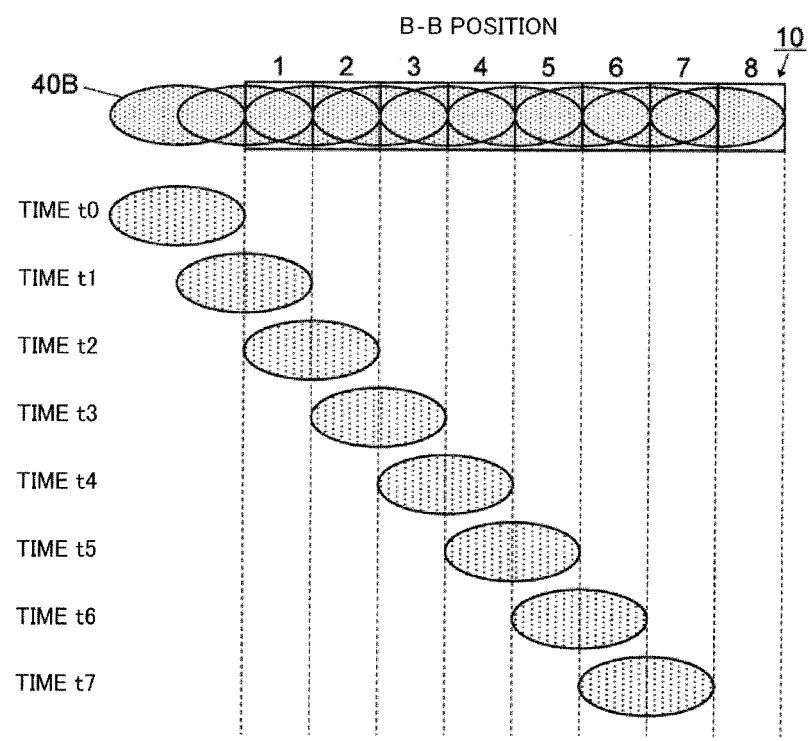
FIG. 23 is a diagram that illustrates a schematic cross-section in a B-B position in FIG. 19, and a relationship between positions of the human body 40B that moves in the cross-section and time.
Figure 24:
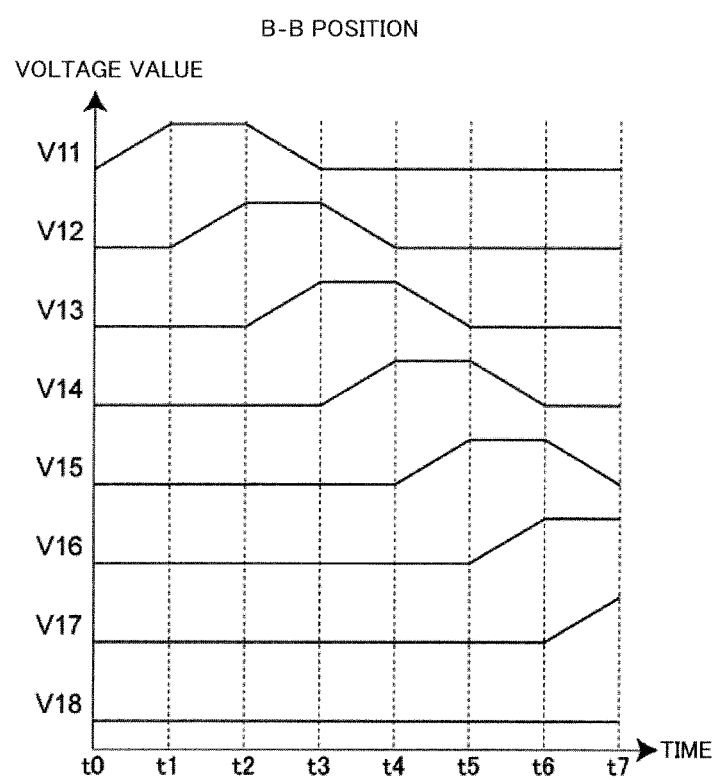
FIG. 24 is a diagram that illustrates a relationship between output voltages V11-V18 of infrared sensors S1-S8 and time during the time from a time t0 to a time t7 in FIG. 23.
Figure 25:
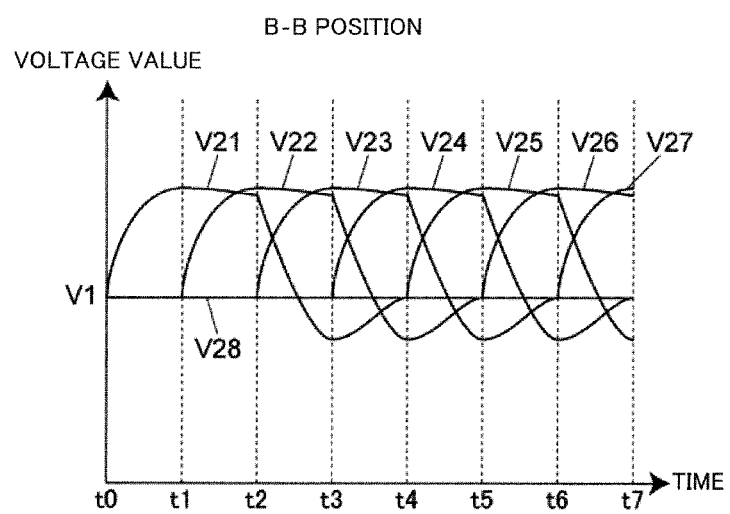
FIG. 25 is a diagram that illustrates a relationship between output voltages V21-V28 of high-pass filters HPF1-HPF8 and time during the time from the time t0 to the time t7 in FIG. 23.

FIG. 23 is a diagram that illustrates a schematic cross-section in a B-B position in FIG. 19, and a relationship between positions of the human body 40B that moves in the cross-section and time. FIG. 24 is a diagram that illustrates a relationship between the output voltages V11-V18 of the infrared sensors S1-S8 and time during the time from a time t0 to a time t7 in FIG. 23. FIG. 25 is a diagram that illustrates a relationship between the output voltages V21-V28 the high-pass filters HPF1-HPF8 and time during the time from the time t0 to the time t7 in FIG. 23.

Figure 26:
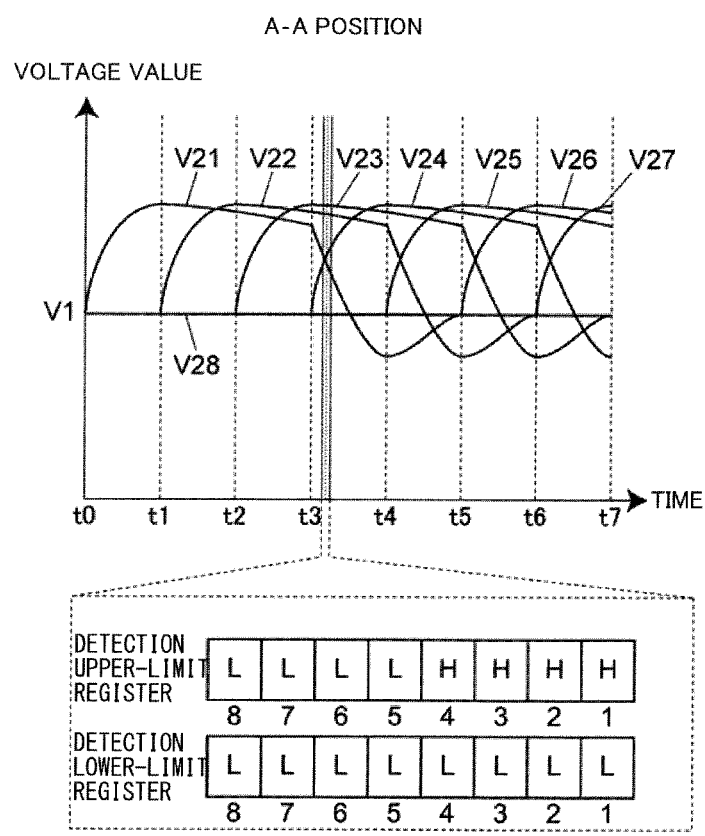
FIG. 26 is a diagram that illustrates signals stored in a detection upper-limit register and a detection lower-limit register when a series of evaluations for output voltages of infrared sensors S1-S8 between a time t3 and a time t4 is finished with respect to the human body 40A in FIG. 19.
Figure 27:
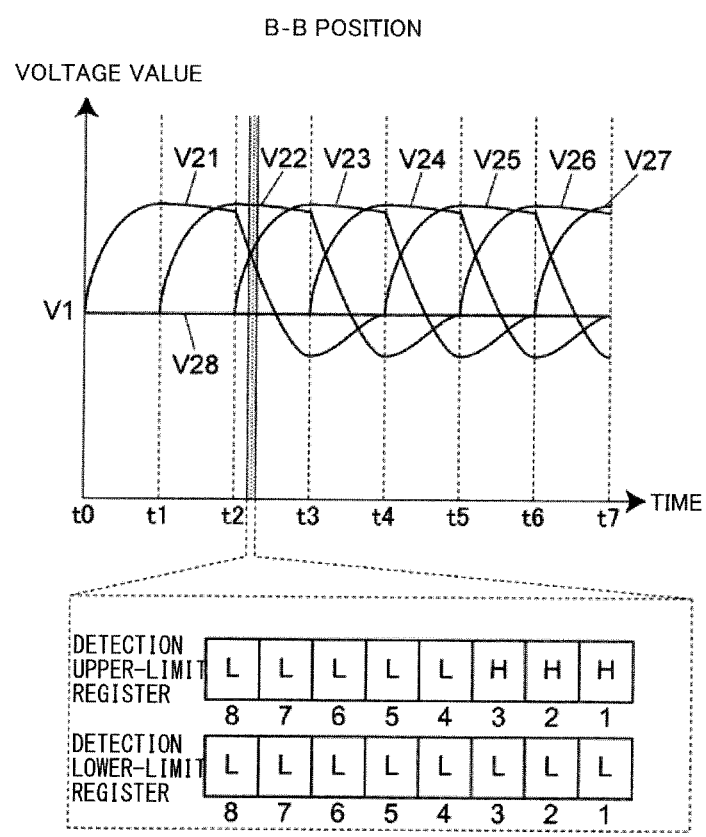
FIG. 27 is a diagram that illustrates signals stored in a detection upper-limit register and a detection lower-limit register when a series of evaluations for output voltages of infrared sensors S1-S8 between a time t2 and a time t3 is finished with respect to the human body 40B in FIG. 19.

FIG. 26 is a diagram that illustrates signals stored in a detection upper-limit register and a detection lower-limit register when a series of evaluations for the output voltages of the infrared sensors S1-S8 between a time t3 and a time t4 is finished with respect to the human body 40A in FIG. 19. FIG. 27 is a diagram that illustrates signals stored in a detection upper-limit register and a detection lower-limit register when a series of evaluations for the output voltages of the infrared sensors S1-S8 between the time t2 and the time t3 is finished with respect to the human body 40B in FIG. 19.

When considering the same as the above determination operation of the determiner 30 explained with reference to FIG. 1 and FIGS. 10-18, with respect to positions of the human body 40A, chronological changes of the output voltages V11-V18 are as shown in FIG. 21, and chronological changes of the output voltages V21-V28 are as shown in FIG. 22.

The human body 40A in FIG. 19 has a size which lies across just three divided areas. Therefore, as for signals stored in the detection upper-limit register REGU when a series of amplification and conversion operations is finished, as illustrated in FIG. 26, the number of consecutive H signals is up to 4.

On the other hand, the human body 40B in FIG. 19 has a size which lies across just two divided areas. Therefore, as for signals stored in the detection upper-limit register REGU when a series of amplification and conversion operations is finished, as illustrated in FIG. 27, the number of consecutive H signals is up to 3.

As a case illustrated in FIG. 10, in a case where the human bodies 40A and 40B are positioned in the infrared-receiving area 10 of the infrared sensors S1-S8 from an initial state, the determiner 30 recognizes a distance between each of the human bodies 40A and 40B and the infrared sensors S1-S8, respectively, by the number of L signals inserted between H signals.

On the other hand, as illustrated in FIG. 19, in a case where the human bodies 40A and 40B are positioned outside the infrared-receiving area 10 of the infrared sensors S1-S8 in the initial state, the determiner 30 recognizes a distance between each of the human bodies 40A and 40B and the infrared sensors S1-S8, respectively, by the number of consecutive H signals.

Thus, a method of recognizing the distance between each of the human bodies 40A and 40B and the infrared sensors S1-S8, respectively, is different depending on circumstances; however, a basic constitution is the same as that which recognizes the distance between each of the human bodies 40A and 40B and the infrared sensors S1-S8, respectively, based on a bit position that has changed equal to or more than a threshold value, that is, based on an arrangement pattern of divided areas in which the movement of the human body is detected.

Note that the determiner 30 may perform both the determination operation explained with reference to FIG. 1, and FIGS. 10-18 and the determination operation explained with reference to FIG. 1, and FIGS. 19-27. Additionally, another determination operation based on an arrangement pattern of divided areas in which the movement of the human body is detected may be performed.

In the example illustrated in FIG. 1, outputs of the infrared sensors S1-S8 are time-division multiplexed; however, in an infrared sensor device according to an embodiment of the present invention an amplifier and a window comparator may be provided for each infrared sensor.

Figure 28:
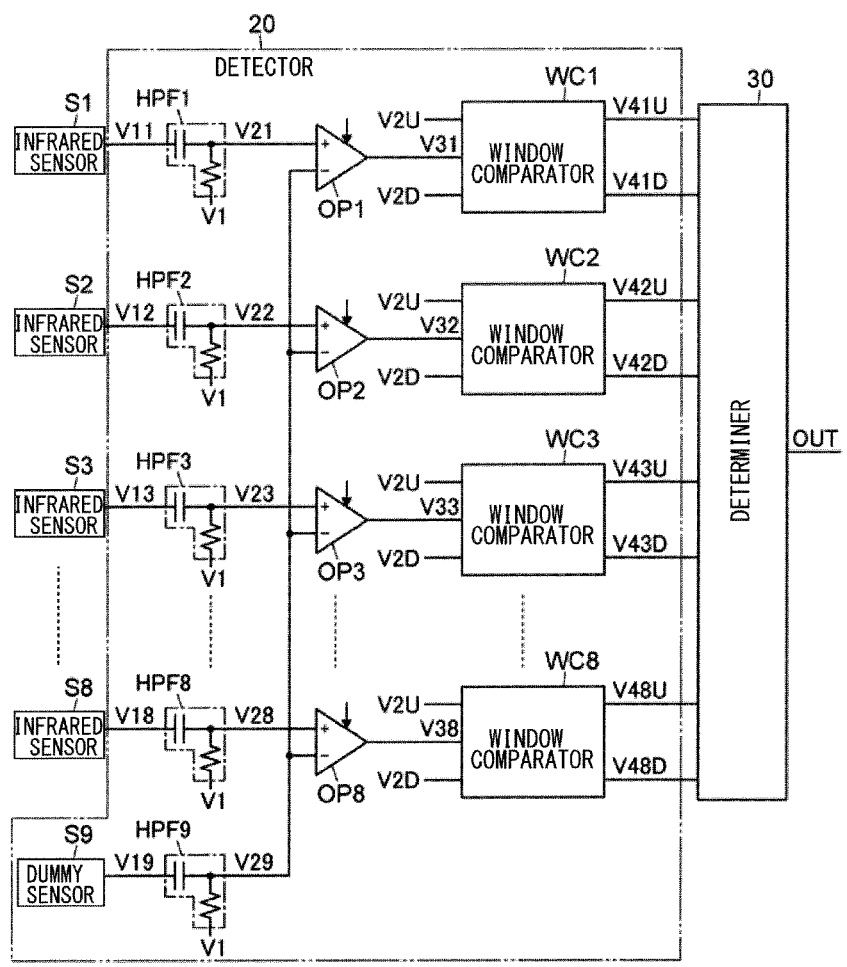
FIG. 28 is a diagram that explains another example according to an embodiment of the present invention.

FIG. 28 is a diagram that explains another example according to an embodiment of the present invention.

In this example, compared to the example illustrated in FIG. 1, the switches SW1-SW8, and the registers REGU, REGD are not provided. And, in this example, amplifiers OP1-OP8 and window comparators WC1-WC8 are provided corresponding to the infrared sensors S1-S8.

To non-inverting input terminals (+) of the amplifiers OP1-OP8, output voltages V21-V28 of high-pass filters HPF1-HPF8 connected to corresponding infrared sensors S1-S8 are inputted, respectively. To each of inverting input terminals (−) of the amplifiers OP1-OP8, an output voltage V29 of a high-pass filter HPF9 connected to a dummy sensor S9 is inputted. It is preferable that the amplifiers OP1-OP8 have an auto-zero function.

Output voltages V31-V38 of the amplifiers OP1-OP8 are inputted to corresponding window comparators WC1-WC8. The window comparators WC1-WC8 output a signal (for example, H signal) that indicates movement of an object is detected when the output voltages V31-V38 of the amplifiers OP1-OP8 are larger than a detection upper-limit voltage (V2U), or less than a detection lower-limit voltage (V2D). And the window comparators WC1-WC8 output a signal (for example, L signal) that indicates that the movement of the object is not detected when the output voltages V31-V38 of the amplifiers OP1-OP8 are equal to or less than the detection upper-limit voltage, or equal to or more than the detection lower-limit voltage.

A signal regarding the detection upper-limit voltage is outputted as each of output signals V41U-V48U. A signal regarding the detection lower-limit voltage is outputted as each of output signals V41D-V48D. The output signals V41U-V48U and the output signals V41D-V48D are inputted to a determiner 30.

Next, operation of this example will be explained.

For example, as illustrated in FIG. 19, consider that in an initial state, human bodies 40A and 40B are positioned outside the infrared-receiving area 10 of the infrared sensors S1-S8, then the human bodies 40A and 40B move to the right from the initial state, and enter the infrared-receiving area 10.

Further, the human body 40A moves in the detection area A, and the human body 40B moves outside the detection area A, and therefore, consider detection of only the movement of the human body 40A. A relationship between positions of the human body 40A with respect to divided areas 1-8 and time during the time from a time t0 to a time t7 is taken as the same as that illustrated in FIG. 20. In this case, chronological changes of the output voltages V11-V18 of the infrared sensors S1-S8 are the same as those illustrated in FIG. 21. And chronological changes of the output voltages V21-V28 of the amplifiers OP1-OP8 are the same as those illustrated in FIG. 22.

Figure 29:
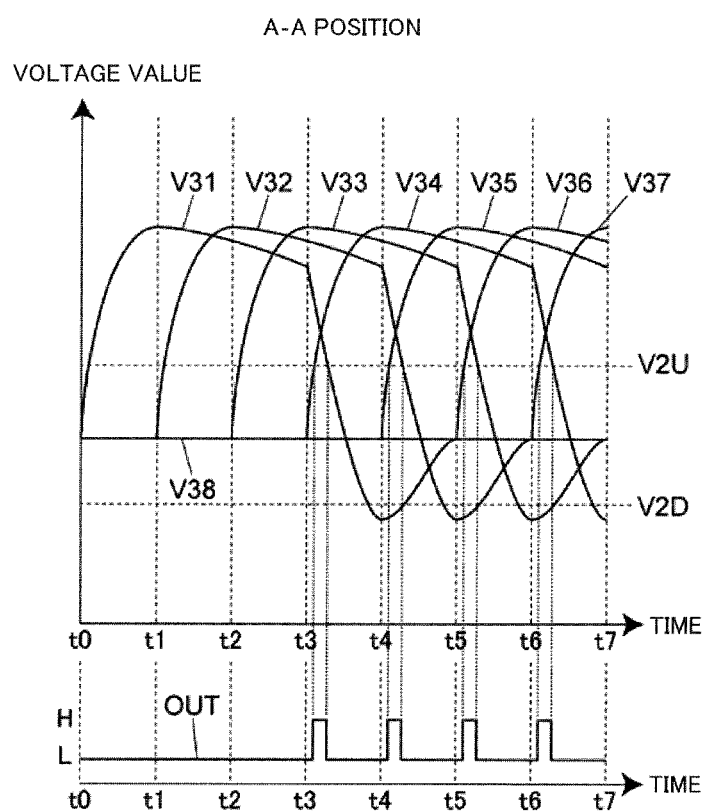
FIG. 29 is a diagram that illustrates a relationship among output voltages V31-V38 of amplifiers OP1-OP8, an output of a determiner 30, and time during the time from a time t0 to a time t7 in FIG. 20 with respect to movement of the human body 40A in FIG. 19.

FIG. 29 is a diagram that illustrates a relationship among output voltages V31-V38 of amplifiers OP1-OP8, an output of a determiner 30, and time during the time from a time t0 to a time t7 in FIG. 20, with respect to movement of the human body 40A in FIG. 19.

The amplifiers OP1-OP8 amplify voltage differences between the output voltages V21-V28 and the output voltage V29. Chronological changes of the output voltages V31-V38 of the amplifiers OP1-OP8 are as shown in FIG. 29.

As illustrated in FIG. 19, in the infrared-receiving area 10, the human body 40A has a size which lies across just three divided areas of the divided areas 1-8. Therefore, in a case where the human body 40A moves in the infrared-receiving area 10, the human body 40A lies across up to four divided areas of the divided areas 1-8.

Therefore, as illustrated in FIG. 29, at a certain time, the number of the output voltages V31-V38 that exceeds the detection upper-limit voltage V2U is 4 at a maximum. Additionally, at a certain time, the number of the output voltages V31-V38 that exceed the detection lower-limit voltage V2D is 4 at a maximum.

At a certain time, in a case where the number of H signals of the output signals V41U-V48U regarding the detection upper-limit voltage of the window comparators WC1-WC8 is equal to or more than 4, or in a case where the number of H signals of the output signals V41D-V48D regarding the detector lower-limit voltage of the window comparator W1-W8 is equal to or more than 4, the determiner 30 outputs the signal (H signal) that indicates that the movement of the human body 40A is detected in the detection area 10A of the infrared-receiving area 10 (see a lower diagram in FIG. 29).

Further, regarding the human body 40B illustrated in FIG. 19, in the infrared-receiving area 10, the human body 40B has a size which lies across just two divided areas of the divided areas 1-8 (see FIG. 23). Therefore, in a case where the human body 40B moves in the infrared-receiving area 10, the human body 40B lies across up to three divided areas of the divided areas 1-8. Chronological changes of the output voltages V21-V28 of the high-pass filters HPF1-HPF8 at the time of the movement of the human body 40B are the same as those illustrated in FIG. 25

Figure 30:
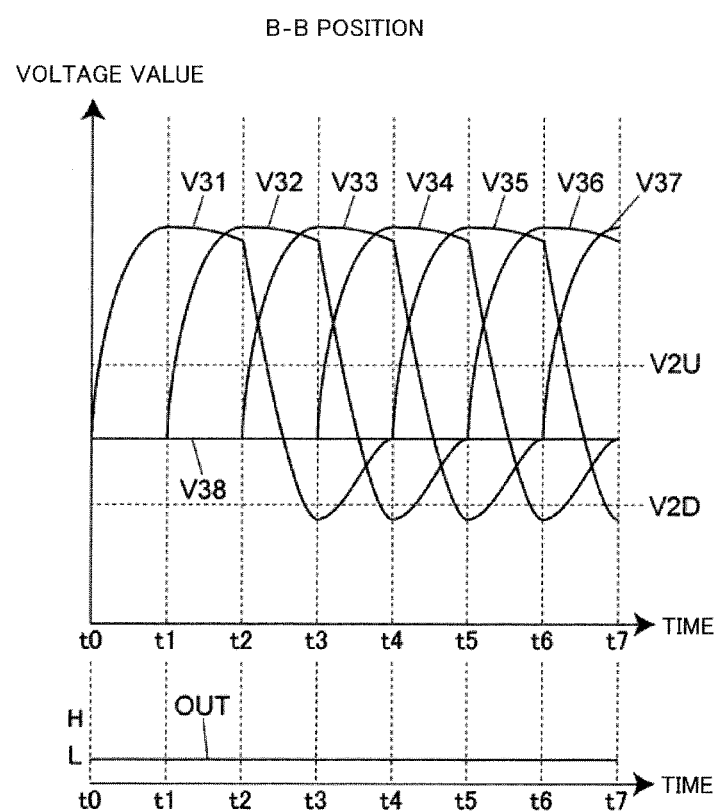
FIG. 30 is a diagram that illustrates a relationship among output voltages V31-V38 of amplifiers OP1-OP8, an output of a determiner 30, and time during the time from the time t0 to the time t7 in FIG. 20 with respect to movement of the human body 40B in FIG. 19.
Figure 31:
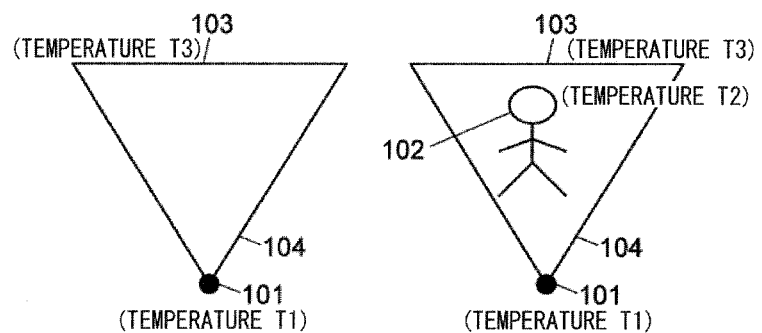
FIG. 31 is a diagram that explains a relationship of temperature among an infrared sensor, a human body, and a background of a detection area.

FIG. 30 is a diagram that illustrates a relationship among the output voltages V31-V38 of the amplifiers OP1-OP8, an output of a determiner 30, and time during the time from a time t0 to a time t7 in FIG. 20, with respect to movement of the human body 40B in FIG. 19.

As illustrated in FIG. 30, when the human body 40B moves in the infrared-receiving area 10 (see FIG. 19), at a certain time, the number of the output voltages that V31-V38 exceed the detection upper-limit voltage V2U is less than or equal to 3.

As described above, in a case where the number of the H signals of the output signals V41U-V48U is equal to or more than 4, or in a case where the number of H signals of the output signals V41D-V48D is equal to or more than 4, the determiner 30 outputs the signal (H signal) that indicates that movement of the human body 40A is detected in the detection area 10A of the infrared-receiving area 10. Therefore, an output signal OUT of the determiner 30 does not become an H signal regarding the movement of the human body 40B in the infrared-receiving area 10.

Thus, the infrared sensor device in the example illustrated in FIG. 28 detects the movement of the human body 40A in the detection area 10A by recognizing distances between the human bodies 40A, and 40B that move and the infrared sensors S1-S8.

In the above examples, the human bodies 40A and 40B in the infrared-receiving area 10 are detected; however, the present invention is not limited thereto. An object to be detected by the infrared sensor device according to an embodiment of the present invention can be an object other than a human body.

Additionally, in the above examples, the infrared-receiving area 10 is radially divided in a plane viewed from above; however, the plane in which the infrared-receiving area is divided in an embodiment of the present invention is not limited to a plane viewed from above, and can be a plane viewed from any directions.

Additionally, in the infrared sensor device according to an embodiment of the present invention, a constitution of a detector is not limited to that of the detector 20 in the above examples. The detector in the infrared sensor device according to an embodiment of the present invention can have any constitution as long as it is possible to detect presence or absence of movement of an object in an infrared-receiving area per divided area based on an output of an infrared sensor.

Additionally, in the infrared sensor device according to an embodiment of the present invention, a determining method of a determiner is not limited to the determining method of the determiner 30 in the above examples. The determiner in the infrared sensor device according to an embodiment of the present invention can use any determining method as long as it is possible to determine whether a moving object is in a detection area in a predetermined distance range from an infrared sensor based on an arrangement pattern of divided areas in which movement of the object detected by the detector in an alignment of the divided areas in the infrared-receiving area.

With respect to a plurality of divided areas in which an infrared-receiving area is radially divided in one plane, the infrared sensor device according to an embodiment of the present invention determines whether a moving object is in a detection area of a predetermined distance range from the infrared sensor, based on an arrangement pattern of divided areas in which movement of the object is detected, and therefore, the infrared sensor device determines whether the movement of the object occurs in a desired detection area or not.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. An infrared sensor device comprising:
   a plurality of infrared sensors that is provided in a plurality of divided areas in which an infrared-receiving area is radially divided in one plane;
   a detector that detects, for each divided area amongst the divided areas, presence or absence of movement of an object in the infrared-receiving area based on signals output from the plurality of infrared sensors; and
   a determiner that determines whether the object is in a detection area in a predetermined distance range from the infrared sensor, based on an arrangement pattern of the signals output from the infrared sensors, in an alignment of the divided areas in the infrared-receiving areas,
   wherein the determiner determines how distant a position occupied by the object is from the infrared sensor device based on the arrangement pattern of the signals output from the infrared sensors.

2. The infrared sensor device according to claim 1, wherein the determiner performs detection based on the number of consecutive divided areas in which the movement of the object is detected, and which are consecutive.

3. The infrared sensor device according to claim wherein the determiner determines the number of divided areas in which the movement of the object is not detected inserted between a plurality of the divided areas in which the movement of the object is detected.

4. The infrared sensor device according to claim 1, wherein the detector includes
   a dummy sensor that has the same constitution as that of the infrared sensors, and where reception of infrared from the infrared-receiving area is blocked;
   a plurality of high-pass filters that is provided for each of the infrared sensors and the dummy sensor, and to which outputs of the infrared sensors or the dummy sensor are inputted, respectively;
   an amplifier that amplifies a voltage difference between output voltages of the high-pass filters connected to the infrared sensors corresponding to the divided areas and an output voltage of the high-pass filter connected to the dummy sensor; and
   a window comparator that outputs a signal that indicates that the movement of the object is detected when the amplified voltage difference is larger than a detection upper-limit voltage or less than a detection lower-limit voltage, outputs a signal that indicates that the movement of the object is not detected when the amplified voltage difference is less than or equal to the detection upper-limit voltage, or equal to or more than the detection lower-limit voltage, and outputs those signals corresponding to the divided areas.

5. The infrared sensor device according to claim 4, wherein the detector further includes:
   a plurality of switches that switches the output voltages of the high-pass filters connected to the infrared sensors in a time-division multiplex manner, and inputs them to one amplifier; and
   a register that stores an output signal of the window comparator corresponding to the divided areas.

6. The infrared sensor device according to claim 4, wherein the detector further includes:
   the comparator and the window comparator per high-pass filter connected to the infrared sensor.

7. An infrared sensor device comprising:
   a plurality of infrared sensors that is provided in a plurality of divided areas in which an infrared-receiving area is radially divided in one plane;

a detector that detects presence or absence of movement of an object in the infrared-receiving area for each of the divided areas based on an output of the infrared sensor; and a determiner that determines whether the object is in a detection area in a predetermined distance range from the infrared sensor, based on an arrangement pattern of the divided areas in which the movement of the object is detected, in an alignment of the divided areas in the infrared-receiving areas, wherein the detector includes a dummy sensor that has the same constitution as that of the infrared sensors, and where reception of infrared from the infrared-receiving area is blocked;

a plurality of high-pass filters that is provided for the infrared sensors and the dummy sensor, and to which outputs of the infrared sensors or the dummy sensor are inputted, respectively;

an amplifier that amplifies a voltage difference between output voltages of the high-pass filters connected to the infrared sensors corresponding to the divided areas and an output voltage of h high-pass filter connected to the dummy sensor; and a window comparator that outputs a signal that indicates that the movement of the object is detected when the amplified voltage difference is larger than a detection upper-limit voltage or less than a detection lower-limit voltage, outputs a signal that indicates that the movement of the object is not detected when the amplified voltage difference is less than or equal to the detection upper-limit voltage, or equal to or more than the detection lower-limit voltage, and outputs those signals corresponding to the divided areas.

8. The infrared sensor device according to claim 7, wherein the detector includes a plurality of switches that switches the output voltages of the high-pass filters connected to the infrared sensors in a time-division multiplex manner, and inputs them to one amplifier; and a register that stores an output signal of the window comparator corresponding to the divided areas.

9. The infrared sensor device according to claim 7, wherein the detector includes the comparator and the window comparator per high-pass filter connected to the infrared sensor.

* * * * *